(No Model.)
S. RITTY.
ATTACHMENT FOR DISK HARROWS.
No. 409,238. Patented Aug. 20, 1889.
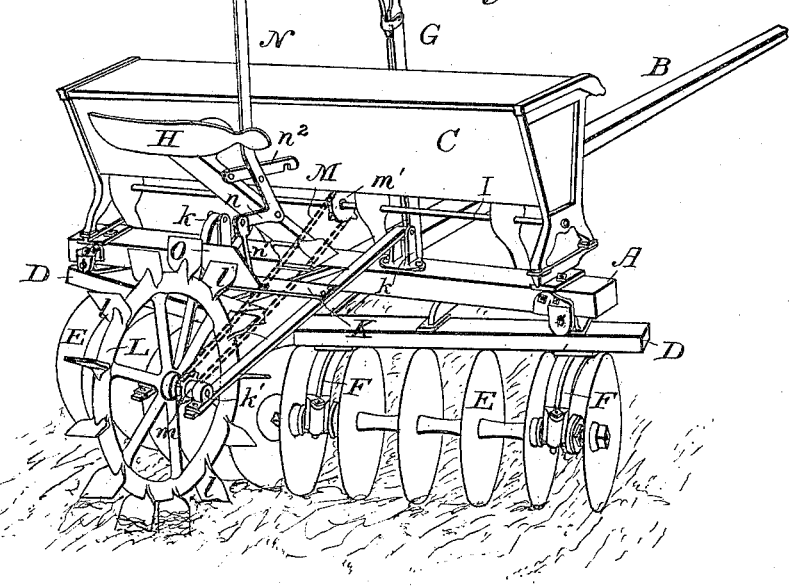
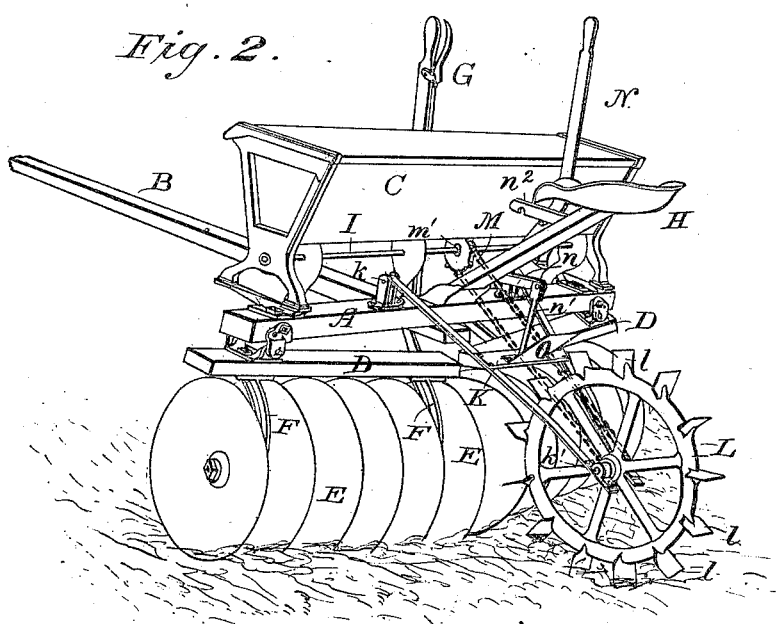
Witnesses
Wm. A. Skinkle
Chas. E. Gorton
Inventor
Sebastian Ritty
By his Attorney
Rasmussen & Rasmussen

UNITED STATES PATENT OFFICE.

SEBASTIAN RITTY, OF DAYTON, OHIO.

ATTACHMENT FOR DISK HARROWS.

SPECIFICATION forming part of Letters Patent No. 409,238, dated August 20, 1889.

Application filed February 4, 1889. Serial No. 298,691. (No model.)

*To all whom it may concern:*

Be it known that I, SEBASTIAN RITTY, a citizen of the United States, residing at Dayton, in the county of Montgomery and State of Ohio, have invented certain new and useful Improvements in Attachments for Disk Harrows, of which the following is a specification.

Heretofore when seeder attachments have been mounted upon disk harrows the power to drive the seeder has been supplied by the rod or shaft upon which the disks are fastened; but this has always been objectionable for reasons hereinafter given. In my present invention I arrange a large wheel having transverse blades or paddles in rear of the central line of the harrow, or the line drawn centrally between the two gangs, connecting this wheel with the frame or cross-head of the machine by hinged supports, so that it will have a floating movement, and also connecting a chain sprocket on the hub of the wheel with a second sprocket on the seeder-shaft. Thus as the harrow is drawn over the ground the blades or paddles sinking into the earth will cause the wheel, which will hereinafter be referred to as the "paddle-wheel," to revolve, and thereby drive the seeder attachment. The blades serve a second object in cutting up and pulverizing the lumps or clods that pass between the gangs at the center.

In the drawings, Figure 1 is a perspective view from the right rear of a machine embodying my invention, and Fig. 2 is a perspective view from the left rear.

A represents the cross-head or main bar of the machine; B, the draft-tongue; C, a seed-box mounted upon said cross-head; D, gang-bars hinged beneath the cross-head to swing vertically and horizontally. E are the disk-gangs supported in bearings formed at the lower ends of hangers F from the gang-bars. G is the usual lever for controlling the angle of the disk-gangs; and H is a seat for the driver, mounted upon the cross-head, all the parts enumerated being of any appropriate type.

I is the seeder-shaft, whereby the feed is regulated. This has usually been driven from one end only, and therefore at a considerable disadvantage, and it derives its power from the shaft of one of the disk-gangs, which, being liable to different angular adjustments and movements both horizontal and vertical, is a very ineffective motor. In order to apply the power to the center of the shaft and obtain other advantages referred to in the preamble, I mount brackets $k$ upon the cross-head, to which are pivoted adjacent to the seeder-shaft the forward arms of a floating frame K, that for lightness and strength converges to its rear, and at the extreme rear end has bearings $k'$, supporting the journals of a wheel L, the arrangement of the frame-pivots and the location of the frame itself being such as to bring this wheel immediately behind the line where the disk-gangs meet each other, or the central line between their inner ends. Around the periphery of the wheel and projecting radially therefrom are a number of transverse blades or paddles $l$ of considerable size, so as to take into the ground to a sufficient depth to insure that the wheel shall revolve as the harrow is thrown forward notwithstanding any counteracting load that may be put upon it by the parts which it is intended to drive. The number of the paddles will vary with the diameter of the wheel, it being only requisite that they shall be so near together that one or more shall always be in engagement with the earth. Mounted upon the hub of this paddle-wheel is a chain-sprocket $m$, from which a chain M is led to an opposing sprocket $m'$, keyed to the seeder-shaft at a point at or adjacent to its center, so that whenever the harrow is thrown forward over the ground the paddle-wheel in its revolutions will transmit power to the seeder-shaft and drive the latter.

A lever N is pivoted to the elbow-lever or to any suitable part of the frame, and has its lower horizontal arm $n$ connected by a link $n'$ with the floating frame, so that the latter may be lifted to raise the paddle-wheel from contact with the ground, thus stopping the action of the seeder, and when so raised it will be held in its elevated position by means of a latch $n^2$, catching over a pin on the lever, or by any other device commonly employed for locking a lever in position.

To guard the driver's feet from mud and dirt that may be thrown up by the paddles, a shield O is fixed to the floating frame at a suitable point between the seat-standard and paddle-wheel.

I have described the frame as hinged to brackets on the cross-head, and deem this the preferable method. It may, however, be hinged to the seeder-shaft directly; but in such case the paddle-wheel will have to overcome the friction of the frame upon such shaft in addition to the resistance due to the friction of the shaft-bearings and to the feed of material. As already stated, the paddle-wheel, being behind the disk gangs and located centrally with respect thereto, will serve to cut and pulverize the lumps or clods which may pass between the two gangs, owing to their angular adjustment. It may therefore be found desirable to maintain it in action while the seeder is at rest, which can obviously be done by means of any ordinary clutch between the seeder-shaft and the sprocket thereon.

I claim—

1. The combination, substantially as hereinbefore set forth, of the cross-head, the disk-gangs carried thereby, the floating frame, and the paddle-wheel mounted in bearings in the rear end of said frame behind the disk-gangs and centrally thereof.

2. The combination, substantially as hereinbefore set forth, of the seeder-shaft having a sprocket about centrally of its length, the cross-head, the disk-gangs, the floating frame hinged to said cross-head, the paddle-wheel mounted in bearings at the rear end of said frame behind the inner ends of the disk-gangs and having a sprocket on its hub, and the chain connecting said sprocket with the sprocket on the seeder-shaft.

3. The combination, substantially as hereinbefore set forth, of the seeder-shaft having a sprocket about centrally of its length, the cross-head, the disk-gangs, the floating frame hinged to said cross-head, the paddle-wheel mounted in bearings at the rear end of said frame behind the inner ends of the disk-gangs, and having a sprocket on its hub, the chain connecting said sprocket with the sprocket on the seeder-shaft, and the lever connected with said floating frame to raise the paddle-wheel from contact with the ground.

4. The combination, substantially as hereinbefore set forth, with the driver's seat, of the floating frame, the paddle-wheel carried thereby, and the shield or guard carried by said frame between the wheel and the seat-standard.

SEBASTIAN RITTY.

Witnesses:
S. H. CARR,
HENRY FISCHER.